(12) United States Patent
Kopp

(10) Patent No.: US 6,460,820 B1
(45) Date of Patent: Oct. 8, 2002

(54) COMBINATION APPLIANCE HOLD-DOWN PLATE

(76) Inventor: John Gordon Kopp, 2006 Via Vina, San Clemente, CA (US) 92673

( * ) Notice: Subject to any disclaimer, the term of this patent is extended or adjusted under 35 U.S.C. 154(b) by 0 days.

(21) Appl. No.: 10/012,648

(22) Filed: Nov. 5, 2001

(51) Int. Cl.$^7$ .............................................. A47B 97/00
(52) U.S. Cl. ..................................... 248/500; 248/544
(58) Field of Search ................................ 248/500, 678, 248/679, 637, 300, 301, 544, 680, 909

(56) References Cited

U.S. PATENT DOCUMENTS

| | | |
|---|---|---|
| D167,722 S | 9/1952 | Rosenthal, Jr. |
| D173,720 S | 12/1954 | Carver et al. |
| 2,820,311 A | 1/1958 | Hamlin |
| 4,162,596 A * | 7/1979 | Damman ................ 248/679 X |
| 4,185,566 A | 1/1980 | Adams |
| 4,283,034 A | 8/1981 | Sheehan |
| 4,669,695 A * | 6/1987 | Chou ....................... 248/500 |
| 4,896,985 A * | 1/1990 | Commins ............... 248/544 X |
| 4,978,092 A | 12/1990 | Nattel |
| 5,048,775 A | 9/1991 | Hungerford, Jr. |
| 5,085,387 A * | 2/1992 | Petterson et al. ....... 248/500 X |
| 5,311,996 A | 5/1994 | Duffy et al. |
| 6,293,398 B1 * | 9/2001 | Grigsby, Jr. ............ 248/500 X |

FOREIGN PATENT DOCUMENTS

EP  0726102  8/1996

* cited by examiner

*Primary Examiner*—Ramon O. Ramirez
(74) *Attorney, Agent, or Firm*—Gene Scott-Patent Law & Venture Group

(57) ABSTRACT

An apparatus comprises in combination, an appliance resting on a support platform and a rigid interconnection strap fastened to the appliance and to the support platform wherein a common face of the strap abuts a face of the appliance and a face of the support platform. The strap is adapted with a reversed lip defining a groove which engages with and receives an upwardly extending lip of the appliance. The strap is fastened to the appliance and to the platform and may be used flat or bent into an L-shape.

12 Claims, 2 Drawing Sheets

COMBINATION APPLIANCE HOLD-DOWN PLATE

BACKGROUND OF THE INVENTION

1. Field of the Invention

This invention relates generally to brackets, struts and supporting or hold-down plates, and more particularly to a combination wherein a plate fastens an appliance to a support footing.

2. Description of Related Art

The following art defines the present state of this field:

Rosenthal, Jr., U.S. D167,722 describes a bed spring support design.

Carver et al., U.S. D173,720 describes a bed spring support design.

Hamlin, U.S. Pat. No. 2,820,311 describes a device for securing a picture and its stretcher frame in a picture frame, comprising a spring clip formed of a U-shaped resilient strip including a long leg and a short leg, said legs being spaced apart and having aligned openings therein spaced from the bight of the U-shaped clip, for the reception of a screw adapted to engage in said picture frame, the short leg resting flat on said picture frame, a laterally and inwardly curved end portion on said long leg adapted to engage over said stretcher frame, the spacing of said arms and opening leaving a space between said arms and the bight of said clip through which said screw extends, providing a means for securing and end of a picture supporting wire to said screw.

Sheehan, U.S. Pat. No. 4,283,034 describes a bracket construction for mounting curtain rods and the like to a conventional wooden molding which eliminates the conventional need for screws or nails. The bracket includes an essentially flat base plate from which a pair of opposed curtain rod receiving arms project forwardly and a top flange which projects rearwardly from the top edge of the base plate and is furthermore provided with downwardly projecting tangs. The flange is adapted to contact upper edge portions of the molding and the tang adapted to project thereinto so as to support the bracket in the desired position on the molding. In addition, a side tab rearwardly projects from the base plate and is adapted to contact the side edge or end wall of the molding so as to mount the bracket at the molding extremity. Normally a pair of such brackets are utilized in conjunction with each other, as for mounting at opposite ends of the molding and in one embodiment of the invention to a pair of such brackets are made joined to each other at their bottom edges along a weakened line so that they may be disconnected for use. In addition, the flange and tab of the brackets, whether the brackets are formed individually or in pairs as above-described, may be readily removed from the base plate so that the bracket may be conventionally attached to the molding by screws or the like, when desired.

Adams, U.S. Pat. No. 4,185,566 describes a bendible bracket useful, for example, in securing shelves or the like to a wall which includes elongated members preformed during manufacturing and packaged in an unbent condition. These brackets are then capable of being bent into the desired angle and secured to a wall so that shelves or the like may be attached thereto.

Nattel, U.S. Pat. No. 4,978,092 describes a universal support market for attachment to the back of an electrical box, supporting the box in a hollow wall structure. The support bracket at the back of the box provides a more rigid mounting to support the box when an electrical plug is pushed into or pulled from an outlet. The bracket comprises an elongate strip of sheet material, one end of the strip having a first flange extending substantially perpendicular to the elongate strip, and having attachment means therein for connection to the back of an electrical box, and a second flange at the other end of the strip, substantially parallel to the first flange, extending from the other side of the strip to rest on the inside surface of a wall board, and at least one scored bend line across the strip such that a portion of the strip may be bent in the same direction as the second flange, and substantially parallel thereto to accommodate a different depth of electrical box and a different depth of wall structure.

Hungerford, Jr., U.S. Pat. No. 5,048,775 describes a device for supporting a plurality of pipes or the like in parallel relationship within a defined space comprises a support bracket which receives a plurality of clamping members wherein a support bracket is readily secured to a structural member.

Duffy et al., U.S. Pat. No. 5,311,996 describes an edge protector for protecting goods having at least one edge against damage of the edge by a strap wrapping the goods comprising a force-distributing member for distributing a force applied by a wrapping strap to goods wrapped by the strap in such a manner as to protect the edge from damage by the strap. A spring clip connected to the force-distributing member and engageable with the strap secures the edge protector to the strap. The clip comprises a proximal portion attached to the force-distributing member and a distal portion spaced apart from the proximal portion and adjacent to but detached from the distal portion. The clip is formed with a cam that is contoured so that the strap can be pressed against the cam to elevate the distal portion of the clip relative to the force-distributing member and slid between the clip and the force-distributing member, thereby securing the strap and the edge protector together and militating against their inadvertent separation even upon removal of the strap from the goods.

Meijer, EP 0726102 describes a method for deforming a plate, wherein the plate is bent along at least one bend line, and a plate suitable for this purpose. The invention also relates to a device for manufacturing such a plate in accordance with this method, wherein the method is distinguished by weakening the plate along the bend line prior to bending. According to another aspect of the invention the methods distinguished by weakening the plate, prior to bending, along at least one bend line containing at least a curve. With the method according to the present invention it is possible to transport flat situation the plates suitable for manufacturing products or semi-manufactured products with a three-dimensional form, whereby less space is required for transport. Forming of the products or semi-manufactured products can herein take place by bending parts of the plate along bend lines manually or using a simple tool at the place of destination. A final advantage is that by bending the flat plates with bend lines arranged according to the present invention products or semi-manufactured products with curving surfaces can be manufactured.

The prior art teaches the use of a very large number of straps, struts and other devices for engaging members where it is desired to attach one to another, but does not teach a strap for engaging a heavy appliance with a support footing so that movement of the appliance is restricted. Such is particularly advantageous when ground movement occurs as in earthquakes and such. The present invention fulfills these needs and provides further related advantages as described in the following summary.

SUMMARY OF THE INVENTION

The present invention teaches certain benefits in construction and use which give rise to the objectives described below.

An apparatus comprises in combination, an appliance resting on a support platform and a rigid interconnection strap fastened to the appliance and to the support platform wherein a common face of the strap abuts a face of the appliance and a face of the support platform. The strap is adapted with a reversed lip defining a groove which engages with and receives an upwardly extending lip of the appliance. The strap is fastened to the appliance and to the platform and may be used flat or bent into an L-shape.

A primary objective of the present invention is to provide an apparatus and method of use of such apparatus that provides advantages not taught by the prior art.

Another objective is to provide such an invention capable of securing a heavy appliance which only rests, but is not fixed in place on a support platform or footing.

A further objective is to provide such an invention capable of being used as a flat plate or bent to form an L-shaped part for surface mounting.

A still further objective is to provide such an invention capable of mounting an anchor insert using the strap as a drilling template.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 2:
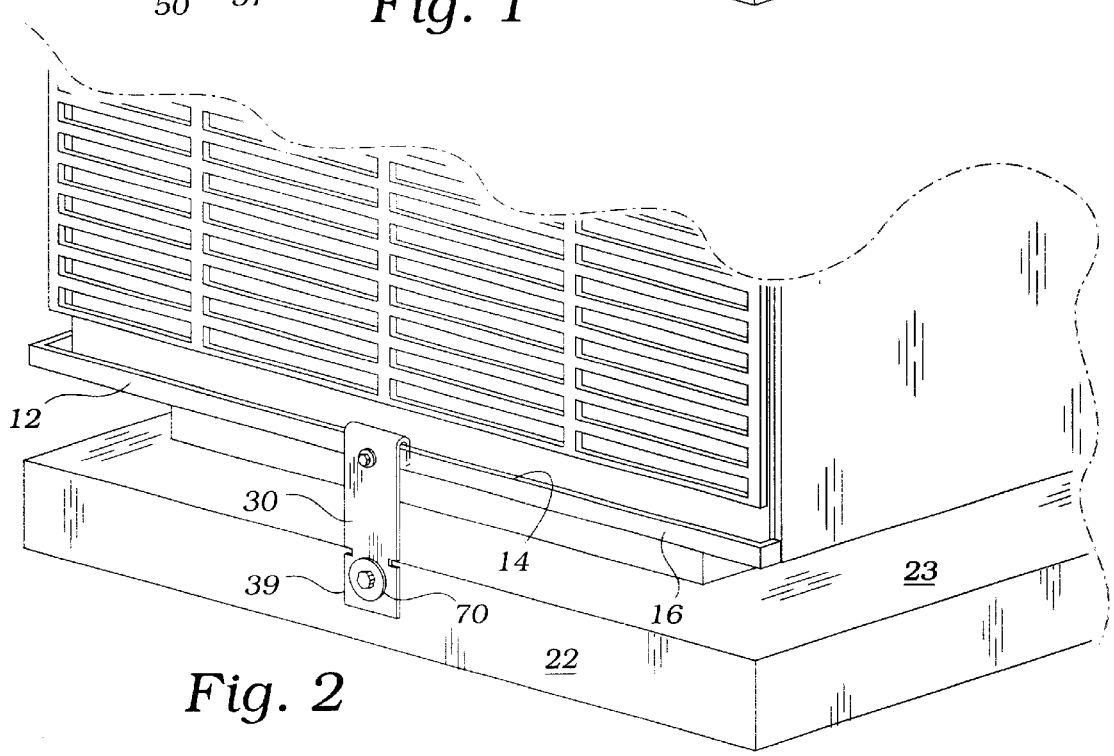
FIG. 2 is a perspective view thereof as assembled.
Figure 3:
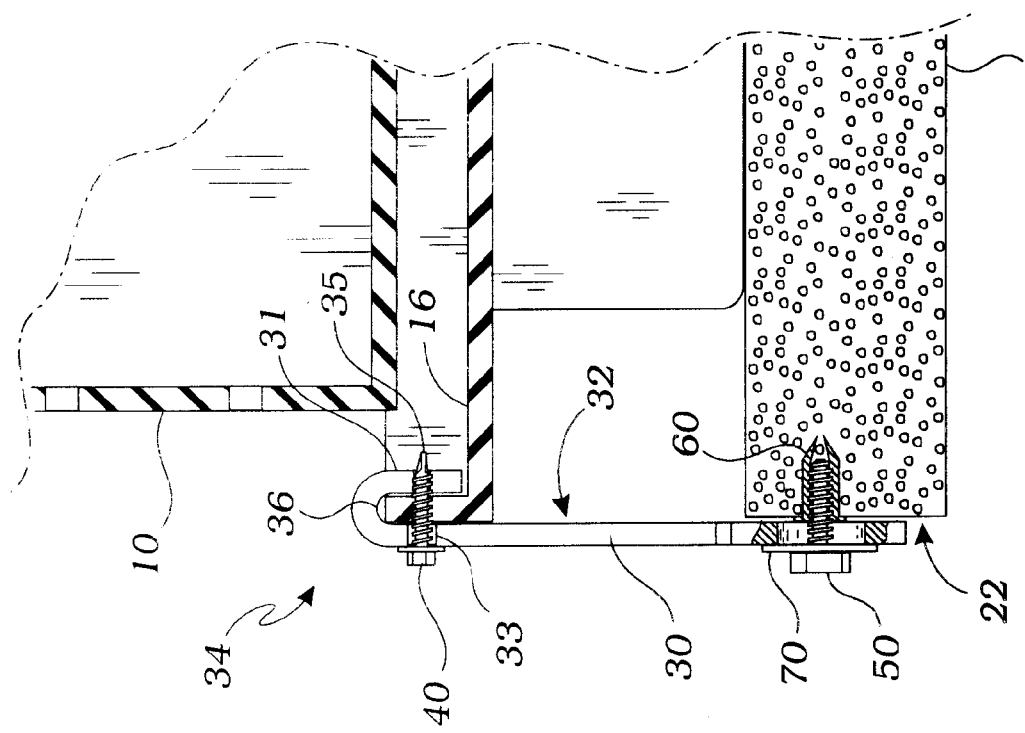
FIG. 3 is a section elevational view thereof showing the invention as used flat.

The present invention is an apparatus comprising, in combination, an appliance 10, such as an air conditioning condenser assembly, resting on a support platform 20, such as a concrete or plastic footing or block, and a rigid interconnection strap 30. The strap 30 is fastened to the appliance 10 and to the support platform 20 as best seen in FIG. 2 and preferably in at least two opposing positions on the sides of the appliance 10. A common face 32 of the strap 30 abuts a face 12 of the appliance 10 and a face 22 or 23 of the support platform 20 as is clear from FIGS. 3 and 4. One end 34 of the strap 30 provides a groove 36 which is engaged with, and receives an upwardly extending lip 14 of the appliance 10. this prevents vertical motion of the appliance. Typically, such air conditioning units include a drip pan 16 which provides the upwardly extending lip 14, but any such abutment or lip may be used.

Figure 1:
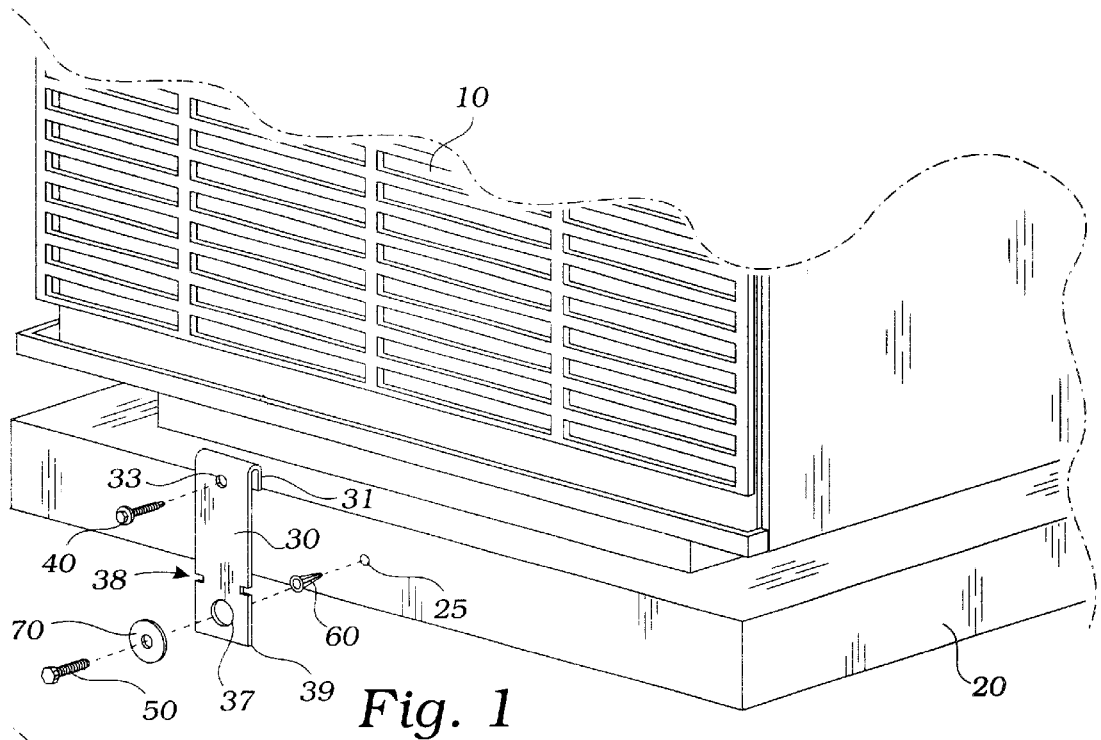
FIG. 1 is a partial perspective exploded view of the preferred embodiment of the invention.
Figure 4:
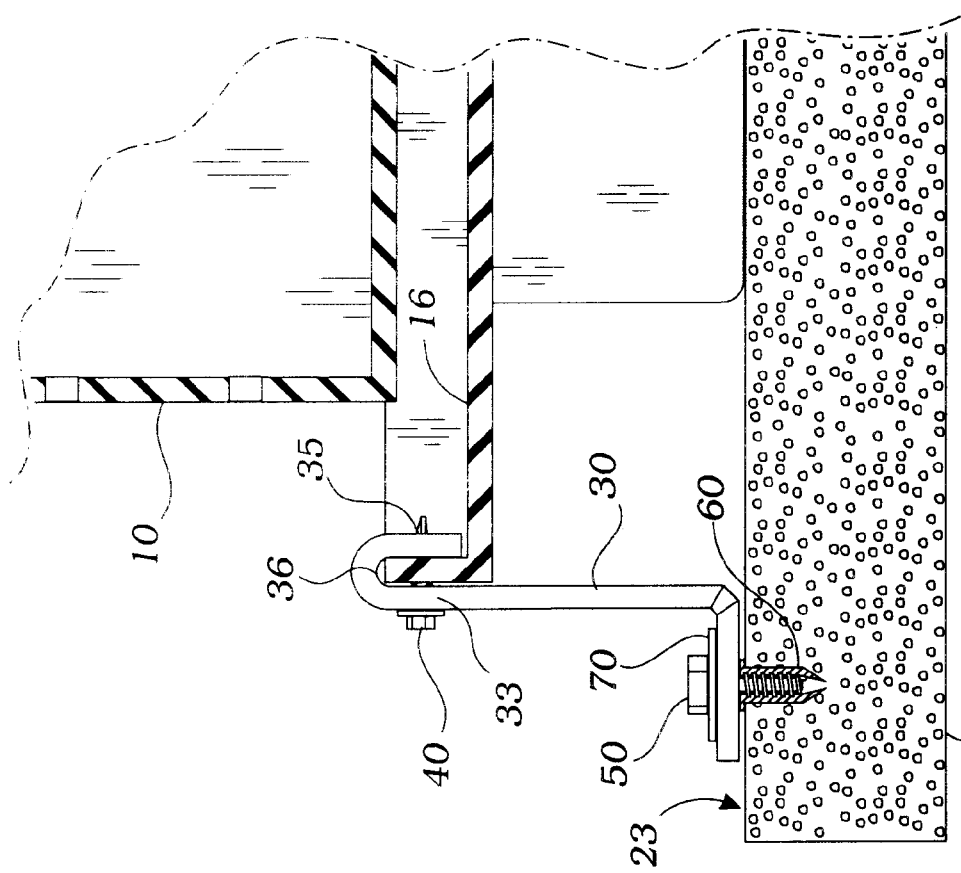
FIG. 4 a similar section elevational view thereof showing the invention as used after being bent into an L-shape.

The rigid interconnection strap 30 preferably further provides a means for selective bending 38 of a foot portion 39 of the strap 30. Preferably, the selective bending means is at least one pair of spaced apart notches 38 as shown in FIGS. 1 and 2. Such notices enable bending of the strap 30 at a preferred position on the strap so as to place the strap 30 into an L-shaped configuration, as shown in FIG. 4. Several such pairs of these notches 38 may be place so that bending of the strap at more than one possible location may be effected so as to accommodate different possible configurations of the appliance 10. In place of the notches 38 it is known in the art that creases (not shown) may be pressed into the strap 30. Other forms of selective weakening of the strap 30 in preferred locations may be selected in place of the notches 38 or creases. Preferably, the rigid interconnection strap 30 is formed as a planar plate or sheet metal through a steel stamping operation, and this strap 30 is clearly shown in FIGS. 1–3. A first fastener 40, such as a sheet metal screw, joins the strap 30 at the upwardly extending lip 14 of the appliance 10 and a second fastener 50 joins the strap 30 to a surface or face 22, or 23 of the support platform 20. Such is clearly shown in FIGS. 3 and 4.

Alternatively, the rigid interconnection strap 30 may be formed into an L-shape by bending it as shown in FIG. 4 and then fastened as described above to a horizontal, upwardly facing face 23 of the support platform 20.

Preferably, for attaching the strap 30 to the appliance 10, the fastening strap 30 provides, in a reversed lip 31, a sheet metal pilot hole 35 adapted for threaded engagement with fastener 40, and in axial alignment with hole 35 a first clearance hole 33 positioned and adapted for accepting the shank of fastener 40 without interference. Once the strap 30 is placed over the lip 14 of appliance 10, hole 33 may be used as a template to drill an appropriate hole in lip 14. Fastener 40 is then threaded into the drilled hole and also into pilot hole 35 for securement. Clearly, more than one set of holes and fasteners may be used to achieve a more stable and secure attachment.

Preferably, for attaching the strap 30 to the support platform 20, a second clearance hole 37 in provided in the strap 30. A concrete anchor insert 60 is adapted, by the relative sizes of the insert and the second clearance hole 37, for passing the insert 60 through the clearance hole 37. Prior to setting the insert 60, the hole 37 is used as a template for drilling insert hole 25 in the support 20. A flat washer 70 is positioned as shown, and the threaded fastener 50, is then engaged with the anchor insert 60. Flat washer 70 is necessary to assure engagement with the head of fastener 50, since hole 37 is larger to enable passage of insert 60.

In another embodiment, shown in FIG. 1, the present invention is a fastening kit comprising the flat plate 30 with means for selective L-shaping 38 to custom fit the plate 30 to a selected installation, a sheet metal fastener 40 adapted for threaded engagement with the pilot hole 35 in the plate 30, wherein the plate provides the clearance hole 37 of a size for passing the concrete anchor insert 60 therethrough. The concrete anchor insert 60 is placed and then the flat washer 70 is placed as shown in FIG. 2 for covering the clearance hole 37 and for accepting the anchor insert bolt 50 while preventing the bolt 50 from passing through hole 37.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising in combination: an appliance resting on a support platform and a rigid interconnection strap fastened to the appliance and to the support platform wherein a common face of the strap abuts a face of the appliance and a face of the support platform, one end of the strap providing a groove engaged with and receiving an upwardly extending lip of the appliance.

2. The combination of claim 1 wherein the appliance is an air conditioning apparatus.

3. The combination of claim 2 wherein the support platform is a footing made from one of concrete and plastic.

4. The combination of claim 1 wherein the support platform is a footing made from one of concrete and plastic.

5. The combination of claim 1 wherein the rigid interconnection strap further provides a means for selective bending of a foot portion thereof.

6. The combination of claim 5 wherein the selective bending means is at least one pair of spaced apart notches.

7. The combination of claim 1 wherein the rigid interconnection strap is planar and further comprising a first fastener joining the strap to the upwardly extending lip of the appliance and a second fastener joining the strap to a vertical side surface of the support platform.

8. The combination of claim 1 wherein the rigid interconnection strap is L-shaped, and further comprising a first fastener joining the strap to the upwardly extending lip of the appliance and a second fastener joining the strap to a horizontal upwardly facing surface of the support platform.

9. A fastening strap assembly apparatus comprising in combination: a rigid interconnection strap having a U-shaped end providing a reversed lip; a means for fastening the reversed lip to an appliance lip; and a means for attaching the strap to a support platform; the interconnection strap further comprising a means for selective bending of a foot portion of the strap.

10. The fastening strap of claim 9 wherein the means for fastening the reversed lip is a clearance hole positioned and adapted for accepting the shank of a sheet-metal fastener without interference therewith, and within the reversed lip, and axially aligned with the clearance hole, a sheet metal pilot hole adapted for accepting the sheet-metal fastener in a threaded relationship.

11. The fastening strap of claim 9 wherein the means for attaching the strap to a support platform is a clearance hole in the strap, a concrete anchor insert adapted for passing through the clearance hole, a flat washer and a threaded fastener adapted for engaging the anchor insert.

12. A fastening kit comprising: a flat plate with means for selective L-shaping to custom fit the plate to a selected installation; a sheet metal fastener adapted for threaded engagement with a pilot hole in the plate; the plate providing a clearance hole of a size for passing a concrete anchor insert therethrough; a concrete anchor insert; a flat washer adapted for covering the clearance hole and for accepting a anchor insert bolt.

\* \* \* \* \*